United States Patent

Nagashima et al.

[11] Patent Number: 6,046,122
[45] Date of Patent: *Apr. 4, 2000

[54] ULTRAVIOLET AND INFRARED RADIATION ABSORBING GLASS

[75] Inventors: Yukihito Nagashima; Nobuyuki Takatsuki; Isamu Kuroda, all of Osaka, Japan

[73] Assignee: Nippon Sheet Glass Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/040,300

[22] Filed: Mar. 18, 1998

[30] Foreign Application Priority Data

Mar. 26, 1997 [JP] Japan .................................. 9-073025

[51] Int. Cl.⁷ ............................. C03C 3/087; C03C 3/095
[52] U.S. Cl. ................................. 501/64; 501/70; 501/71; 501/905
[58] Field of Search .................... 501/64, 70, 71, 501/905

[56] References Cited

U.S. PATENT DOCUMENTS

| | | | |
|---|---|---|---|
| 5,077,133 | 12/1991 | Chang | 501/64 |
| 5,214,008 | 5/1993 | Beckwith et al. | 501/69 |
| 5,240,886 | 8/1993 | Gulotta et al. | 501/70 |
| 5,318,931 | 6/1994 | Nakaguchi et al. | 501/70 |
| 5,385,872 | 1/1995 | Gulotta et al. | 501/71 |
| 5,593,929 | 1/1997 | Krumwiede et al. | 501/70 |
| 5,723,390 | 3/1998 | Kijima et al. | 501/70 |
| 5,763,342 | 6/1998 | Mita et al. | 501/70 |
| 5,776,845 | 7/1998 | Boulos et al. | 501/70 |
| 5,776,846 | 7/1998 | Sakaguchi et al. | 501/70 |
| 5,830,812 | 11/1998 | Shelestak et al. | 501/71 |
| 5,858,894 | 1/1999 | Nagashima et al. | 501/64 |
| 5,858,896 | 1/1999 | Nagashima et al. | 501/64 |

FOREIGN PATENT DOCUMENTS

| | | |
|---|---|---|
| 0 469 446 | 2/1992 | European Pat. Off. . |
| 0 565 835 A2 | 10/1993 | European Pat. Off. . |
| 0 598 305 A1 | 5/1994 | European Pat. Off. . |
| 0 709 344 A1 | 5/1996 | European Pat. Off. . |
| 04 310539 | 11/1992 | Japan . |
| 06 056466 | 3/1994 | Japan . |
| 09 208254 | 8/1997 | Japan . |
| 09 295828 | 11/1997 | Japan . |
| 09 295829 | 11/1997 | Japan . |
| 91 07356 | 10/1991 | WIPO . |

*Primary Examiner*—Karl Group
*Attorney, Agent, or Firm*—Sughrue, Mion, Zinn Macpeak & Seas, PLLC

[57] ABSTRACT

An ultraviolet and infrared radiation absorbing glass is disclosed, comprising, in % by weight:

basic glass components comprising
65 to 80% $SiO_2$,
0 to 5% $Al_2O_3$,
0 to 10% MgO,
5 to 15% CaO,
10 to 18% $Na_2O$,
0 to 5% $K_2O$,
5 to 15% MgO+CaO,
10 to 20% $Na_2O+K_2O$,
0 to 5% $B_2O_3$, and
0.07 to 0.18% $SO_3$, and coloring components comprising
0.40 to 0.90% total ion oxide (T-$Fe_2O_3$) in terms of $Fe_2O_3$,
1.0 to 2.0% $CeO_2$, and
0 to 1.0% $TiO_2$, with 27 to 40% of said T-$Fe_2O_3$ being FeO in terms of $Fe_2O_3$.

13 Claims, No Drawings

ULTRAVIOLET AND INFRARED RADIATION ABSORBING GLASS

FIELD OF THE INVENTION

The present invention relates to an ultraviolet and infrared radiation absorbing glass having a green tint. More particularly, the present invention relates to an ultraviolet and infrared radiation absorbing glass for use as a glass for automobiles.

BACKGROUND OF THE INVENTION

In recent years, the interior trim of automobiles tends to be luxury, and to cope with the demand for the protection of the interior trim from deterioration and to reduce the load of air conditioning, a green-tinted glass having ultraviolet and infrared radiation absorbing power imparted thereto has been proposed as window glass of automobiles.

For example, glass having an ultraviolet transmission reduced to about 38% or less, a total solar energy transmission limited to about 46% or less and a visible light transmission of at least 70% for ensuring the vision from the inside of an automobile, is known. Further, there is a recent trend that a bluish green tint is preferred for such a green-tinted glass for automobiles.

It is known that the total solar energy transmission can be decreased by increasing the absolute amount of ferrous oxide (FeO) out of the iron oxides introduced into the glass, and almost all of conventional infrared radiation absorbing glasses use this method.

On the other hand, various methods have hitherto been proposed on a method for decreasing an ultraviolet transmission. For example, JP-A-6-56466 (the term "JP-A" as used herein means an "unexamined published Japanese patent application") discloses an ultraviolet radiation absorbing glass having a green tint, which comprises a soda-lime-silica basic glass composition having incorporated therein, as coloring components, 0.53 to 0.70% of total iron oxides in terms of $Fe_2O_3$, 0.5 to 0.8% of $CeO_2$, 0.2 to 0.4% of $TiO_2$, and 30 to 40% of FeO in terms of $Fe_2O_3$ based on the total iron oxides in terms of $Fe_2O_3$.

JP-B-6-8812 (the term "JP-B" as used herein means an "examined Japanese patent publication") discloses an ultraviolet radiation absorbing glass having a green tint, which comprises, in % by weight, a basic glass composition comprising 65 to 75% of $SiO_2$, 0 to 3% of $Al_2O_3$, 1 to 5% of MgO, 5 to 15% of CaO, 10 to 15% of $Na_2O$, and 0 to 4% of $K_2O$, and coloring components comprising 0.65 to 1.25% of total iron oxides in terms of $Fe_2O_3$, 0.2 to 1.4% or 0.1 to 1.36% of $CeO_2$ and 0.02 to 0.85% of $TiO_2$.

JP-A-8-208266 discloses an ultraviolet and infrared radiation absorbing glass having a green tint, which comprises a soda-lime glass having incorporated therein 0.52 to 0.63% of total ion oxides in terms of $Fe_2O_3$, 0.9 to 2% of $CeO_2$, 0.2 to 0.6% of $TiO_2$ and 0 to 0.002% of CoO, as coloring components.

Since cerium oxide is expensive, an ultraviolet and infrared radiation absorbing glass having decreased cerium oxide content has also been proposed.

For example, JP-A-4-231347 describes a green-tinted ultraviolet radiation absorbing glass, which comprises a soda-lime-silica basic glass composition having incorporated therein, as coloring components, more than 0.85% by weight of total iron oxide (T-$Fe_2O_3$) in terms of $Fe_2O_3$, with the FeO/T-$Fe_2O_3$ ratio being less than 0.275, and less then 0.5% by weight of $CeO_2$.

JP-A-6-191881 discloses an ultraviolet radiation absorbing glass having a pale green tint, which comprises a soda-lime-silica basic glass composition having incorporated therein a coloring agent part comprising less than 2.0% of $TiO_2$ and more than 0.6% of total iron oxide (T-$Fe_2O_3$) in terms of $Fe_2O_3$ with the FeO/T-$Fe_2O_3$ ratio being less than 0.35.

JP-B-7-121815 discloses an ultraviolet radiation absorbing green glass, which comprises a soda-lime glass having incorporated therein 0.7 to 0.95% of total iron oxide in terms of $Fe_2O_3$ and 0.19 to 0.24% of FeO. In this case, it is very important that the $SO_3$ content is within an extremely narrow range of from 0.20 to 0.25% by weight.

In the above-described conventional ultraviolet and infrared radiation absorbing glasses, the ultraviolet absorbing power is imparted by the ultraviolet absorption of $Fe_2O_3$, $CeO_2$ and $TiO_2$ individually or by the interaction thereof. Of these components, the ultraviolet absorption of $Fe_2O_3$ or the ultraviolet absorption by the interaction between $TiO_2$ and FeO extends to the visible region. Accordingly, when the glass is designed to have an increased ultraviolet absorption, the visible light transmission in the short wavelength region is simultaneously lowered and as a result, the glass comes to have a yellowish tint. Therefore, in order to enhance the ultraviolet absorbing power without giving a yellowish tint which is not preferred as a glass for automobiles, the composition must have a large $CeO_2$ content.

However, $Fe_2O_3$ and $CeO_2$ are an oxidizing agent and when these are contained in a large amount, it is very difficult to obtain a glass which has an oxidation-reduction equilibrium of iron oxide shifted to the reduction side and thus contains a large amount of FeO to thereby exhibit excellent infrared absorption. More specifically, in order to cancel the oxidation action of $Fe_2O_3$ and $CeO_2$ and shift the oxidation-reduction equilibrium of the iron oxide to the reduction side more than usual, a reducing agent must be added to a batch in a larger amount than usual. This encourages decomposition of the salt cake (sodium sulfate) which accelerates melting of the batch, particularly, melting of the quartz sand, as a result, not only the solubility of batch, particularly, of quartz sand is worsened to cause extreme reduction in the melting capacity but also floating of undissolved quartz sand (so-called scum) may be generated or a ream defect having a larger silica content (so-called silica-rich ream) may come out on the surface.

SUMMARY OF THE INVENTION

The present invention has been made in the light of the above-described problems encountered in the conventional techniques.

Accordingly, an object of the present invention is to provide an ultraviolet and infrared radiation absorbing glass free from a yellowish tint which is not preferred as a glass for automobiles and having excellent ultraviolet and infrared absorbing power, in a high productivity without causing extreme reduction in the melting capacity or in the yield due to scum or reams.

The ultraviolet and infrared radiation absorbing glass of the present invention comprises, in % by weight:

basic glass components comprising:
65 to 80% $SiO_2$,
0 to 5% $Al_2O_3$,
0 to 10% MgO,
5 to 15% CaO,
10 to 18% $Na_2O$,
0 to 5% $K_2O$, 5 to 15% MgO+CaO,
10 to 20% $Na_2O+K_2O$,
0 to 5% of $B_2O_3$, and
0.07 to 0.18% of $SO_3$, and
coloring components comprising
   0.40 to 0.90% total iron oxide (T-$Fe_2O_3$) in terms of $Fe_2O_3$,
   1.0 to 2.0% of $CeO_2$, and
   0 to 1.0% of $TiO_2$,
wherein 27 to 40% of the T-$Fe_2O_3$ is FeO in terms of $Fe_2O_3$.

In the ultraviolet and infrared radiation absorbing glass of the present invention, the basic glass component preferably comprise 0.07 to 0.14% by weight of $SO_3$.

The ultraviolet and infrared radiation absorbing glass of the present invention preferably comprises, when the glass has a thickness of 4.75 to 6.25 mm, 0.40 to 0.60% by weight of total iron oxide (T-$Fe_2O_3$) in terms of $Fe_2O_3$.

The ultraviolet and infrared radiation absorbing glass of the present invention preferably comprises, when the glass has a thickness of 3.25 to 4.25 mm, 0.60 to 0.90% by weight of total iron oxide (T-$Fe_2O_3$) in terms of $Fe_2O_3$.

In any cases, the ultraviolet and infrared radiation absorbing glass of the present invention preferably comprises 1.45 to 2.0% by weight of $CeO_2$.

Further, FeO in terms of $Fe_2O_3$ preferably occupies 30 to 40% of the T-$Fe_2O_3$.

The ultraviolet and infrared radiation absorbing glass of the present invention preferably has, when the glass has a thickness of 3.25 to 6.25 mm, optical characteristics such that a visible light transmission determined with CIE standard illuminant A is 70% or more, a solar energy transmission is less than 50%, an ultraviolet transmission defined by ISO 9050 is 10% or less, and a dominant wavelength determined with CIE standard illuminant C is 495 to 535 nm.

DETAILED DESCRIPTION OF THE INVENTION

The reasons for limitations of the glass composition of the ultraviolet and infrared radiation absorbing glass according to the present invention are described below. Hereinafter, all percents are by weight.

$SiO_2$ is a main component of forming a skeleton of glass. If the $SiO_2$ content is less than 65%, the glass has poor durability, whereas if it exceeds 80%, it is difficult to melt the glass composition.

$Al_2O_3$ is a component of improving durability of glass. However, if the $Al_2O_3$ content exceeds 5%, it is difficult to melt the glass composition. The $Al_2O_3$ glass content is preferably from 0.1 to 2%.

MgO and CaO are used to improve durability of glass and at the same time to control liquidus temperature and viscosity of glass composition in forming a glass. If the MgO content exceeds 10%, the liquidus temperature rises. If the CaO content is less than 5% or exceeds 15%, the liquidus temperature rises. If the total content of MgO and CaO is less than 5%, durability of the glass lowers, and if it exceeds 15%, the liquidus temperature rises.

$Na_2O$ and $K_2O$ are used as a glass melting accelerator. If the $Na_2O$ content is less than 10% or if the total content of $Na_2O$ and $K_2O$ is less than 10%, the effect of melting acceleration is poor. If the $Na_2O$ content exceeds 18% or if the total content of $Na_2O$ and $K_2O$ exceeds 20%, durability of the glass decreases. The $K_2O$ content preferably does not exceed 5% because $K_2O$ is expensive as compared with $Na_2O$.

$B_2O_3$ is a component used for improving durability of the glass or as a melting aid, but it also has a function of enhancing the ultraviolet absorption. If the $B_2O_3$ content exceeds 5%, decrease of the transmission in the ultraviolet region extends to the visible region. As a result, not only the tint tends to be yellowish, but also disadvantages occur in forming a glass due to volatilization of $B_2O_3$ and the like. Accordingly, the upper limit of the $B_2O_3$ content is 5%.

The iron oxide is present in the glass in the form of $Fe_2O_3$ and FeO. $Fe_2O_3$ is a component of enhancing the ultraviolet absorbing power together with $CeO_2$ and $TiO_2$, and FeO is a component of enhancing the absorption power of heat rays.

Where the total iron oxide (T-$Fe_2O_3$) content is within the range of from 0.40 to 0.90%, the FeO/T-$Fe_2O_3$ ratio is preferably from 0.27 to 0.40 in order to obtain a desired total solar energy absorbing power. The FeO content used in this ratio is usually expressed in terms of $Fe_2O_3$ content.

In order to obtain a desired ultraviolet absorption effect with the above-described ratio of total iron oxide content and FeO/T-$Fe_2O_3$, it is necessary for the $CeO_2$ content to be in the range of from 1.0 to 2.0%. If the $CeO_2$ content is less than 1.0%, sufficiently high ultraviolet absorption effect cannot be obtained. On the other hand, if it exceeds 2.0%, the absorption of visible light in the short wavelength side is too large and the glass is tinted yellow, and as a result, desired visible light transmission and dominant wavelength cannot be obtained.

When the ultraviolet and infrared radiation absorbing glass has a thickness of 4.75 to 6.25 mm, the total iron oxide content is preferably 0.40 to 0.60%, and in this case, the FeO/T-$Fe_2O_3$ ratio is preferably 0.30 to 0.40.

When the ultraviolet and infrared radiation absorbing glass has a thickness of from 3.25 to 4.25 mm, the total iron oxide content is preferably 0.60 to 0.90%, and in this case, the FeO/T-$Fe_2O_3$ ratio is also preferably 0.30 to 0.40.

The $CeO_2$ content is preferably 1.0 to 2.0%, and more preferably 1.45 to 2.0%.

$TiO_2$ is not an essential component, but can be added in a small amount in order to enhance the ultraviolet absorbing power, within the range of not impairing optical characteristics intended in the present invention. If the $TiO_2$ content is large, the glass is readily tinted yellowish. Therefore, the upper limit of the $TiO_2$ content is 1.0%, preferably 0.3%, and more preferably 0.15%.

The glass having the above-described composition may further contain other coloring components, such as CoO, NiO, MnO, $V_2O_5$ or $MoO_3$, and $SnO_2$ as a reducing agent individually or in combination of two or more thereof in a total amount of 0 to 1%, so long as green tint intended in the present invention is not impaired. In particular, CoO gives a blue tint and is therefore effective in preventing the glass color from being tinted yellow due to increase in the amounts of $Fe_2O_3$, $CeO_2$ or $TiO_2$. The amount of CoO added is preferably 3 to 20 ppm.

$SO_3$ is a component that a sulfur content in the sulfur-containing materials such as salt cake added to the raw materials remains in the glass as an oxide. The $SO_3$ content specified in the present invention plays an important role.

In the production of an ultraviolet and infrared radiation absorbing glass which is required to have an increased degree of reduction more than usual while containing a relatively large amount of $Fe_2O_3$ or $CeO_2$ which shows an oxidizing power as in the present invention, undissolved quartz sand aggregates (so-called scum) or reams having a large silica content (so-called silica-rich ream) tend to be formed as described above. In order to prevent such a phenomenon, the glass must have an $SO_3$ content of 0.07% or more in order to accelerate the melting of quartz sand. This can be achieved by increasing the amount of salt cake added to the batch to, for example, about 20 Kg or more per 1 ton of quartz sand or by adding other sulfates such as iron sulfate as a raw material.

$SO_3$ content, total iron oxide (T-$Fe_2O_3$) content, FeO (in terms of $Fe_2O_3$)/T-$Fe_2O_3$ ratio, $TiO_2$ content, and $CeO_2$ content in the glasses obtained and optical characteristics thereof are shown in Table 1 below. In Table 1, the contents are all % by weight.

TABLE 1

| | Examples | | | | | | | | |
|---|---|---|---|---|---|---|---|---|---|
| | 1 | 2 | 3 | 4 | 5 | 6 | 7 | 8 | 9 |
| $SO_3$ (wt %) | 0.08 | 0.12 | 0.12 | 0.10 | 0.09 | 0.12 | 0.12 | 0.10 | 0.10 |
| T-$Fe_2O_3$ (wt %) | 0.50 | 0.55 | 0.55 | 0.63 | 0.50 | 0.55 | 0.60 | 0.62 | 0.62 |
| FeO/T-$Fe_2O_3$ (wt %) | 0.35 | 0.30 | 0.30 | 0.33 | 0.35 | 0.30 | 0.30 | 0.33 | 0.33 |
| $TiO_2$ (wt %) | 0.03 | 0.10 | 0.13 | 0.25 | 0.10 | 0.25 | 0.03 | 0.12 | 0.25 |
| $CeO_2$ (wt %) | 1.40 | 1.50 | 1.50 | 1.70 | 1.60 | 1.50 | 1.65 | 1.65 | 1.65 |
| Thickness (mm) | 5.0 | 5.0 | 5.0 | 5.0 | 5.0 | 5.0 | 4.0 | 4.0 | 4.0 |
| YA (%) | 74.5 | 75.2 | 74.9 | 71.7 | 73.4 | 73.6 | 74.6 | 73.9 | 72.8 |
| TG (%) | 47.5 | 48.3 | 48.1 | 43.1 | 46.6 | 47.0 | 48.1 | 46.8 | 45.9 |
| Tuv (%) | 9.2 | 7.7 | 8.5 | 5.6 | 8.1 | 7.0 | 9.2 | 8.6 | 7.9 |
| Dw (nm) | 497 | 501 | 505 | 518 | 508 | 515 | 505 | 512 | 520 |
| Pe (%) | 2.9 | 2.1 | 1.9 | 2.6 | 2.2 | 1.7 | 2.5 | 2.3 | 2.1 |

However, increase of the $SO_3$ content in the glass in turn causes another problem such as generation of bubbles due to reboiling, particularly reboiling due to stirring with a stirrer. This reboiling phenomenon tends to occur as the $SO_3$ content increases. Accordingly, in order to prevent reduction in the yield due to the reboiling phenomenon, the $SO_3$ content in the glass must be 0.18% or less, and preferably 0.14% or less.

Further, for adjusting the $SO_3$ content in the glass to fall within the above-described preferred range in order to prevent generation of scum or silica-rich reams and bubbles due to reboiling while ensuring a desired degree of reduction for the glass, a sulfide ion-containing material (for example, a sulfide such as iron sulfide, or a blast furnace slag such as Calmite produced by Calmite Co., Ltd. and Rivermite produced by Kawatetsu Kogyo KK) is preferably used as a raw material.

The present invention is described in greater detail below by referring to the Examples, but it should be understood that the present invention is not construed as being limited thereto. Unless otherwise indicated, all parts, percents, ratios and the like are by weight.

EXAMPLES 1 TO 9

A typical soda-lime-silica glass batch component was appropriately compounded with ferric oxide, iron sulfide or blast furnace slug, titanium oxide and cerium oxide so as to have composition shown in Table 1 below. A carbonaceous reducing agent was appropriately further added to the resulting mixture. The mixed batch was melted in an electric furnace at 1,500° C. for 4 hours. The molten glass was cast on a stainless steel plate and annealed to obtain glass samples each having a thickness of about 10 mm. Each glass obtained was polished to have a thickness of 5 mm or 4 mm. A visible light transmission (YA) measured with the CIE standard illuminant A, a total solar energy transmission (TG), an ultraviolet transmission (Tuv) defined by ISO, a dominant wavelength (DW) measured with the CIE standard illuminant C and an excitation purity (Pe) were measured as optical characteristics of each glass.

As is apparent from Table 1, the glass samples of the Examples each having a thickness of 5 mm or 4 mm, had optical characteristics such that the visible light transmission measured with CIE standard illuminant A is 70% or more, the total solar energy transmission is less than 50%, the ultraviolet transmission is less than 10% and the dominant wavelength measured with CIE standard illuminant C is 495 to 535 nm.

EXAMPLES 10 TO 12 AND COMPARATIVE EXAMPLES 1 AND 2

Glasses of Examples 10 to 12 were prepared by appropriately changing the amounts of salt cake, carbonaceous reducing agent, iron sulfide and the like in the bath of the glass sample of Example 8. Those glass had an $SO_3$ content as shown in Table 2 below. Generation of scum and reboiling tendency were evaluated. The results obtained are shown in Table 2 below.

Further, glass samples of Comparative Examples 1 and 2 were prepared, which had an $SO_3$ content fallen outside the scope of the present invention, as shown in Table 2 below. The results of evaluation on the generation of scum and the reboiling phenomenon are also shown in Table 2 below.

The glass samples of Examples 10 to 12 and Comparative Examples 1 and 2 were the same as the sample of Example 8 with respect to the total iron oxide (T-$Fe_2O_3$) content, the FeO (in terms of $Fe_2O_3$)/T-$Fe_2O_3$ ratio, the $TiO_2$ content and the $CeO_2$ content.

The generation of scum was evaluated by roughly classifying the amount of quartz sand come out on the surface of the melted solution when 50 g of batch was placed in a 200 ml platinum crucible and melted in an electric furnace at 1,450° C. for 10 minutes, as follows.

○: Area of quartz sand covering the surface of the melt is approximately less 20%

Δ: Area of quartz sand covering the surface of the melt is approximately 20 to 50% x: Area of quartz sand covering the surface of the melt is approximately more than 50%.

The reboiling tendency was evaluated by placing the glass obtained after melted in a crucible, on a platinum tray, melting it at 1,300° C. and examining whether bubbles are generated during melting.

TABLE 2

|  | SO$_3$ Content (%) | Generation of Scum | Reboiling Phenomenon |
|---|---|---|---|
| Example 8 | 0.10 | ○ | Almost no occurrence |
| Example 10 | 0.08 | Δ | Almost no occurrence |
| Example 11 | 0.13 | ○ | Almost no occurrence |
| Example 12 | 0.16 | ○ | Slightly occurred |
| Comparative Example 1 | 0.05 | × | Almost no occurrence |
| Comparative Example 2 | 0.21 | ○ | Occurred |

In samples of Examples 8 and 10 to 12 having an SO$_3$ content within the scope of the present invention, the amount of scum generated was small and the reboiling tendency was slight as compared with samples of Comparative Examples, although the amount of scum generated was slightly increased in the sample of Example 10 having a smaller SO$_3$ content. On the other hand, in the sample of Comparative Example 1 having an SO$_3$ content lower than the lower limit of the present invention, a large amount of scum were generated and in the sample of Comparative Example 2 having an SO$_3$ content larger than the upper limit of the present invention, the scum was slightly generated, but the reboiling was readily occurred.

As described in detail above, according to the ultraviolet and infrared radiation absorbing glass and the production process thereof of the present invention, a green-tinted ultraviolet and infrared absorbing glass having an excellent ultraviolet and infrared radiation absorbing power, particularly, excellent ultraviolet absorbing capability, can be produced without yellowing the tint.

Further, according to the production process of the present invention, a green-tinted ultraviolet and infrared radiation absorbing glass can be produced in a high productivity without incurring problems on the production, such as generation of scum, silica-rich reams or reboiling.

While the invention has been described in detail and with reference to specific embodiments thereof, it will be apparent to one skilled in the art that various changes and modifications can be made therein without departing from the spirit and scope thereof.

What is claimed is:

1. An ultraviolet and infrared radiation absorbing glass comprising, in % by weight:
   basic glass components comprising
      65 to 80% SiO$_2$,
      0 to 5% Al$_2$O$_3$,
      0 to 10% MgO,
      5 to 15% CaO,
      10 to 18% Na$_2$O,
      0 to 5% K$_2$O,
      5 to 15% MgO+CaO,
      10 to 20% Na$_2$O+K$_2$O,
      0 to 5% B$_2$O$_3$, and
      0.07 to 0.18% SO$_3$, and
   coloring components comprising
      0.40 to 0.90% total ion oxide (T-Fe$_2$O$_3$) in terms of Fe$_2$O$_3$,
      1.45 to 2.0% CeO$_2$, and
      0 to 0.15% TiO$_2$,
with 27 to 40% of said T-Fe$_2$O$_3$ being FeO in terms of Fe$_2$O$_3$.

2. The ultraviolet and infrared radiation absorbing glass as claimed in claim 1, wherein the SO$_3$ content is 0.07 to 0.14%.

3. The ultraviolet and infrared radiation absorbing glass as claimed in claim 1 or 2, wherein the total iron oxide (T-Fe$_2$O$_3$) content in terms of Fe$_2$O$_3$ is 0.40 to 0.60%, when said ultraviolet and infrared radiation absorbing glass has a thickness of 4.75 to 6.25 mm.

4. The ultraviolet and infrared radiation absorbing glass as claimed in claim 1 or 2, wherein the total iron oxide (T-Fe$_2$O$_3$) content in terms of Fe$_2$O$_3$ is 0.60 to 0.96%, when said ultraviolet and infrared radiation absorbing glass has a thickness of from 3.25 to 4.25 mm.

5. The ultraviolet and infrared radiation absorbing glass as claimed in claim 1 or 2, wherein 30 to 40% of said T-Fe$_2$O$_3$ is FeO in terms of Fe$_2$O$_3$.

6. The ultraviolet and infrared radiation absorbing glass as claimed in claim 1 or 2, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

7. The ultraviolet and infrared radiation absorbing glass as claimed in claim 3, wherein 30 to 40% of said T-Fe$_2$O$_3$ is FeO in terms of Fe$_2$O$_3$.

8. The ultraviolet and infrared radiation absorbing glass as claimed in claim 4, wherein 30 to 40% of said T-Fe$_2$O$_3$ is FeO in terms of Fe$_2$O$_3$.

9. The ultraviolet and infrared radiation absorbing glass as claimed in claim 3, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

10. The ultraviolet and infrared radiation absorbing glass as claimed in claim 4, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

11. The ultraviolet and infrared radiation absorbing glass as claimed in claim 5, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

12. The ultraviolet and infrared radiation absorbing glass as claimed in claim 7, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

13. The ultraviolet and infrared radiation absorbing glass as claimed in claim 8, wherein the glass has a visible light transmission determined with CIE standard illuminant A of 70% or more, a solar energy transmission of less than 50%, an ultraviolet transmission defined by ISO (International Organization for Standardization) of 10% or less, and a dominant wavelength determined with CIE standard illuminant C of from 495 to 535 nm, when said ultraviolet and infrared radiation absorbing glass has a thickness of from 3.25 to 6.25 mm.

* * * * *